March 27, 1962 P. G. TURNER 3,026,605
HOLLOW TURBINE BLADES
Filed Sept. 11, 1957 2 Sheets-Sheet 1
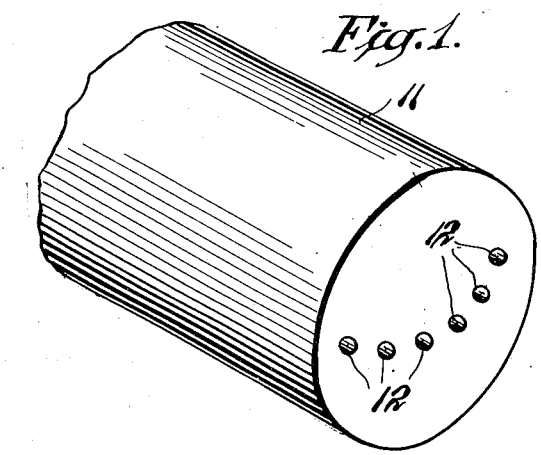
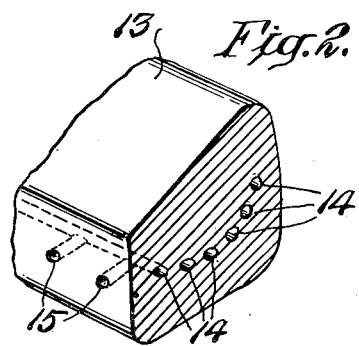
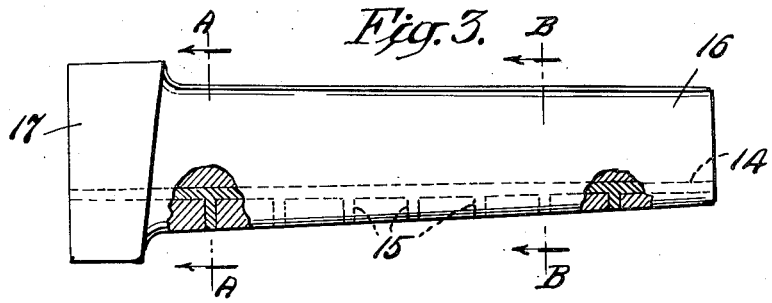
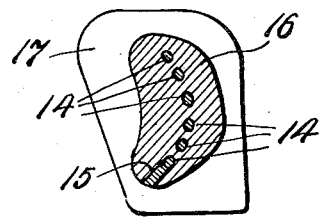
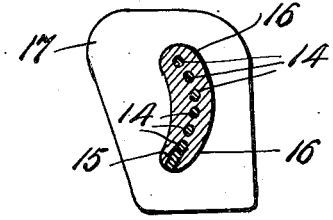
INVENTOR.
PHILIP G. TURNER
BY
ATTORNEY March 27, 1962  P. G. TURNER  3,026,605
HOLLOW TURBINE BLADES
Filed Sept. 11, 1957  2 Sheets-Sheet 2
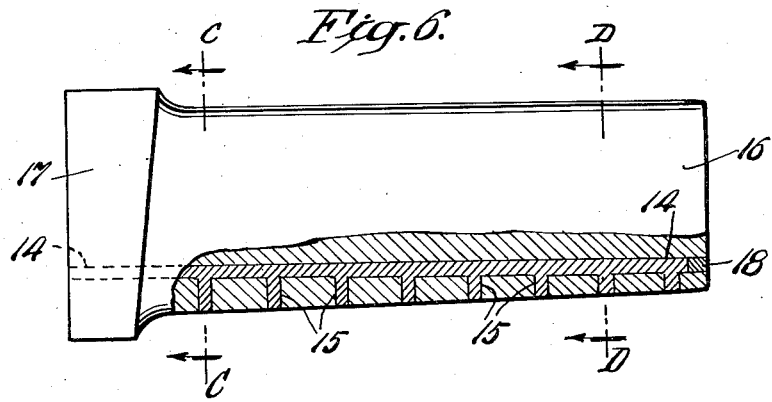
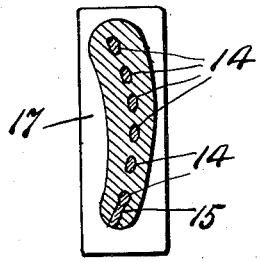 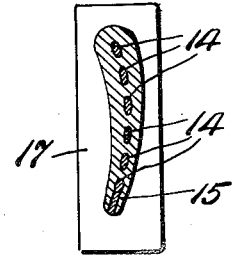
INVENTOR.
PHILIP G. TURNER
BY
ATTORNEY

United States Patent Office 3,026,605
Patented Mar. 27, 1962

3,026,605
HOLLOW TURBINE BLADES
Philip George Turner, Inkberrow, England, assignor to The International Nickel Company, Inc., New York, N.Y., a corporation of Delaware
Filed Sept. 11, 1957, Ser. No. 683,426
Claims priority, application Great Britain Sept. 13, 1956
4 Claims. (Cl. 29—156.8)

The present invention relates to the manufacture of hollow gas turbine blades and, more particularly, to the manufacture of hollow gas turbine blades having lateral cooling passages terminating in the trailing edges of said blades.

It is known that turbine blades, especially for gas turbine engines, having cooling passages extending parallel to one another from the root to the tip can be made by extruding a metal billet having a number of holes filled with a filler, so that during the extrusion the filler flows with the metal and the holes become elongated and reduced in cross-sectional area; and subsequently removing the filler. The product of the extrusion is not the finished blade but rather either a blank or a bar which can be cut to form a number of blanks and each blank is machined to the desired shape and size.

Now it is desirable for aerodynamic reasons that the trailing edge of the blade should be very thin or sharp, since by making the trailing edge thin the turbulence of the fluid immediately behind and in contact with it is reduced. It is very difficult, however, to provide this thin trailing edge on a blade having cooling passages. By expelling cooling fluid from the trailing edge of the blade, the use of a very sharp trailing edge may be avoided. However, means which have heretofore been available have not been entirely satisfactory for this purpose in modern high temperature, high thrust engines.

Although many attempts were made to overcome the foregoing difficulties and other disadvantages, none, as far as I am aware, was entirely successful when carried into practice commercially on an industrial scale.

It is an object of the present invention to provide a novel hollow turbine blade wherein means are provided for ejecting cooling fluid from the trailing edge of said blade.

Another object of the present invention is to provide a novel method for manufacturing a hollow turbine blade wherein means are provided for ejecting cooling fluid from the trailing edge of said blade.

Other objects and advantages will become apparent from the following description taken in conjunction with the accompanying drawing in which:

FIGURE 1 depicts a billet of heat-resistant metal having a plurality of filled holes in accordance with the teachings of the present invention;

FIGURE 2 depicts an extruded section made from said filled billet wherein lateral holes are drilled and filled in accordance with the present invention;

FIGURE 3 shows a longitudinal view in part section of a blade blank made from said extruded section;

FIGURE 4 illustrates a cross section of said blade blank at A—A;

FIGURE 5 illustrates a cross section of said blade blank at B—B;

FIGURE 6 shows a longitudinal view in part section of a blade made from the blade blank shown in FIGURES 3, 4 and 5;

FIGURE 7 illustrates a cross section of said blade at C—C; and

FIGURE 8 illustrates a cross section of said blade at D—D.

Generally speaking, the present invention contemplates a novel turbine blade having a plurality of substantially longitudinal cooling passages and having a plurality of lateral cooling passages extending from at least one of said longitudinal passages to the trailing edge of said blade. These lateral cooling passages are adapted to provide the required amount of cooling fluid according to aerodynamical needs. A turbine blade according to this invention has a number of holes of varying cross-sectional area lying substantially normal to the trailing edge and extending therefrom to a cooling passage parallel to and adjacent to said trailing edge. In this way the trailing edge can be substantially thicker without having a detrimental effect on the aerodynamic properties of the blade. At the same time, the edge is cooled by the egress of the cooling fluid through the holes from the passage.

Advantageously, the cooling passage adjacent to the trailing edge is blind in that it extends through the root into and through the blade at right angles to the holes with which it communicates, but does not extend through the metal of the blade at the tip. It is simplest to make the passage run to the tip and then close the end of it. Advantageously, the cross-sectional area of the holes extending to the trailing edge vary with the distance of the hole from the root of the blade so that the cooling fluid emerges substantially evenly along the entire length of the trailing edge. These holes may vary progressively in cross-sectional area in such manner that each hole may pass the required amount of cooling air to compensate for pressure drop, turbulence and vacuum effect.

This invention includes the manufacture of these blades by the extrusion of a billet having one or more cooling passages filled with a filler, so as to elongate the passage or passages. Then holes are drilled substantially normal to what will become the trailing edge to meet a cooling passage. These holes are filled with filler, the blade is shaped by a forging operation and the filler is leached from the passages and holes.

Referring now to the drawings, which illustrate an embodiment of the invention, FIGURE 1 shows a right cylindrical billet 11 of nickel-chromium heat-resisting alloy which is drilled with a number of axial holes 12 on an arc across the center of said billet. The holes 12, which eventually form the cooling passages, are then filled with rods of filler. Billet 11 is then extruded through a die to give an extruded segment 13 as shown in FIGURE 2. This extruded segment has embryonic leading and trailing edge sections of an integral root blade. Holes 12 have been converted into passages 14. A number of lateral holes 15 are drilled into that side of the extruded section 13 which will eventually be the trailing edge of the blade and connect with one or more passages 14 substantially at right angles. Lateral holes 15 are circular and preferably increase in cross-sectional area progressively from the end which will become the root to the other end. For example, the area of the hole at the root end may be only one half of that nearest to the tip end, or vice versa. Lateral holes 15 are then filled with a filler. Extruded section 13 is now machined to form blade part 16 integral with a root part 17 as shown in FIGURES 3, 4 and 5. The final shaping of the blade and root is effected by a stamping or pressing operation, the results of which are shown in FIGURES 6, 7 and 8. During this operation passages 14 and holes 15 are deformed from their circular shape to an oval or pseudo-elliptical shape, but the progressive increase in area of holes 15 remains substantially unchanged. The blade part 16 is now of the desired final section and the root part 17 is rectangular. The next step in the manufacture of the blade is the leaching of the filler from the holes by a solution which attacks the filler, but not the alloy, or at least preferentially attacks the filler. Finally, the end of passage 14 into which holes 15 run is plugged by plug 18 shown in FIGURE 6.

Blades according to this invention having a thickness at the trailing edge of 0.080 inch may have similar aerodynamic properties as a blade without the holes at the trailing edge having a thickness at the same point of 0.040 inch. The cooling fluid emerging from the holes at the trailing edge destroys the vacuum or partial vacuum caused by turbulence in the ambient fluid as it passes over the blade's thick trailing edge. Cooling of the trailing edge is also enhanced.

For the purpose of giving those skilled in the art a better understanding of the invention and/or a better appreciation of the advantages of the invention, the following illustrative example is given:

*Example*

A billet or bar of nickel-chromium-cobalt alloy (carbon 0.1 max., titanium 1.8–3.0, chromium 18–21, aluminum 0.8–2.0, silicon 1.5 max., manganese 1.0 max., iron 5.0 max., cobalt 15–21, nickel balance), 5″ long and 4″ diameter is drilled with a pattern of holes designed to provide a normal cooling pattern in the final blade. In this case the hole for cooling the trailing edge will be larger than normal and further from the edge or may be left out and the next hole enlarged to receive the lateral holes. The holes are then filled with a filler rod of iron 88%, manganese 10% and titanium 2% and the ends welded or peened over to fasten the rods in position. The billet is then heated to 1180° C. and extruded at a ratio of approximately 2½ or 3:1 to a predetermined form. This form is such that when it is machined and reheated and drop forged or pressed it will completely and exactly fill a die of normal turbine blade forging type.

After extrusion, the trailing edge of the extrusion may be drilled or electro-eroded in such manner as the engine designer desires. The size and shape of the holes being controlled to meet his requirements for cooling.

Finally, these lateral holes which should connect with the nearest longitudinal holes should be themselves filled with filler rod and the extrusion may then be heated to 1160° C. and stamped and pressed into a blade.

With respect to the manufacture of turbine blades integral with roots by means of the novel process, it should be understood that the term "heat-resistant metal" is used to include austenitic nickel-chromium alloys, including nickel-chromium-iron and nickel-chromium-cobalt, and cobalt-chromium alloys, including cobalt-chromium-iron alloys, which contain a total of at least about 25% nickel plus chromium, cobalt plus chromium, or nickel plus chromium plus cobalt, (i.e., a total of at least about 25% of chromium plus nickel and/or cobalt) in addition to small amounts of aluminum, titanium, molybdenum, tungsten, niobium, tantalum, silicon, manganese, zirconium and boron which may optionally be present in the alloys. These alloys are adapted to be subjected in use to temperatures up to about 700° C. or above and, accordingly, must be hot worked at temperatures around 1200° C. Titanium-containing ferritic manganese steels, for example, steel containing from about 5% to about 20% manganese and from about 1% to 10% titanium are especially suitable. Metal-ceramic mixtures (wherein the metal has a melting point above about 1250° C. and is soluble in dilute mineral acids), such as magnesia and iron are also quite suitable for use with hot-workable heat-resistant metal. Such fillers are disclosed in the copending Betteridge U.S. application Serial No. 509,380, now U.S. Patent No. 2,891,307, and Hignett U.S. application Serial No. 472,755, now U.S. Patent No. 2,941,281.

In the case of either of the above mentioned fillers, the filler may have a core which is substantially insoluble in the leaching acid. This core is advantageously a wire and is described in copending U.S. application Serial No. 657,453.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. In a process for the production of a turbine blade having at least one longitudinal cooling passage, the improvement which comprises providing a billet having at least one axial longitudinal filled hole, extruding said filled billet to form an extruded segment having embryonic leading and trailing edge portions of an integral root blade and having at least one longitudinal filled hole therein, drilling and filling a plurality of lateral holes extending from the exterior of the embryonic trailing edge portion to at least one longitudinal filled hole of said extruded segment, machining the thus-formed extruded section to a blade blank having an integral root portion, hot working the machined blade blank between dies to form an airfoil blade having the lateral filled holes opening substantially on the trailing edge of said blade, and thereafter removing the filler from said blade.

2. The improvements according to claim 1 wherein the lateral holes are drilled so that they are progressively larger in cross-sectional area towards the blade end.

3. In a process for the production of a turbine blade having a root integral with a blade portion and having a plurality of longitudinal cooling passages, the improvement which comprises providing a billet having a plurality of axial longitudinal filled holes lying on an arc across the centerline of said billet, extruding said filled billet to form an extruded segment having embryonic leading and trailing edge portions of an integral root blade, drilling and filling a plurality of lateral holes extending from the exterior of the embryonic trailing edge portion to at least one of said longitudinal filled holes, machining the thus formed extruded section to a blade blank having an integral root portion, hot working the machined blade blank between dies to form an airfoil blade having the lateral filled holes opening substantially on the trailing edge of said blade, and thereafter removing the filler from said blade.

4. The improvement according to claim 3 wherein the lateral holes are drilled so that they are progressively larger in cross-sectional area toward the blade end.

References Cited in the file of this patent

UNITED STATES PATENTS

| | | |
|---|---|---|
| 2,047,555 | Gardner | July 14, 1936 |
| 2,830,357 | Tunstall et al. | Apr. 15, 1958 |
| 2,866,313 | Holl | Dec. 30, 1958 |

FOREIGN PATENTS

| | | |
|---|---|---|
| 619,634 | Great Britain | Mar. 11, 1949 |
| 624,815 | Great Britain | June 16, 1949 |
| 726,909 | Great Britain | Mar. 23, 1955 |

OTHER REFERENCES

Article: NACA Reserch Memorandum published by the "National Advisory Committee for Aeronautics," dated April 13, 1951. Pages 8, 35, 37, 39, 41 and 43 to 46.